(12) United States Patent
Treviño et al.

(10) Patent No.: US 10,475,012 B2
(45) Date of Patent: Nov. 12, 2019

(54) SYSTEMS AND METHODS FOR INSTALLATION OF A REMOTELY MONITORED VENDING NETWORK

(71) Applicant: VENDWATCH TELEMATICS, LLC, Austin, TX (US)

(72) Inventors: Alfonso Javier Barragán Treviño, Monterrey (MX); James J. Crow, Austin, TX (US)

(73) Assignee: Vendwatch Telematics, LLC, Austin, TX (US)

( * ) Notice: Subject to any disclaimer, the term of this patent is extended or adjusted under 35 U.S.C. 154(b) by 138 days.

(21) Appl. No.: 15/127,802

(22) PCT Filed: Mar. 23, 2015

(86) PCT No.: PCT/US2015/022083
§ 371 (c)(1),
(2) Date: Sep. 21, 2016

(87) PCT Pub. No.: WO2015/148409
PCT Pub. Date: Oct. 1, 2015

(65) Prior Publication Data
US 2017/0109719 A1    Apr. 20, 2017

Related U.S. Application Data

(60) Provisional application No. 61/969,581, filed on Mar. 24, 2014.

(51) Int. Cl.
| | | |
|---|---|---|
| G06F 17/00 | (2019.01) | |
| G06Q 20/18 | (2012.01) | |
| G06Q 30/06 | (2012.01) | |
| H04W 88/02 | (2009.01) | |

(52) U.S. Cl.
CPC ............ *G06Q 20/18* (2013.01); *G06Q 30/06* (2013.01); *H04M 2250/52* (2013.01); *H04W 88/02* (2013.01)

(58) Field of Classification Search
CPC ...................................................... G06F 17/00
USPC ......................................................... 705/16
See application file for complete search history.

(56) References Cited

U.S. PATENT DOCUMENTS

| | | |
|---|---|---|
| 6,754,558 B2 | 6/2004 | Preston et al. |
| 2009/0157220 A1 | 6/2009 | Walker et al. |

(Continued)

FOREIGN PATENT DOCUMENTS

JP    2008506208    2/2008

OTHER PUBLICATIONS

European Patent Office, Extended European Search Report dated Jul. 31, 2017 in European Patent Application No. 15768658.5.

(Continued)

*Primary Examiner* — Russell S Glass
(74) *Attorney, Agent, or Firm* — Trop, Pruner & Hu, P.C.

(57) ABSTRACT

An embodiment provides a system of automated workflow management and active checkpoint validation that streamlines and standardizes the vending machine provisioning process. The embodiment not only normalizes the installation and deployment process across geographic and personnel differences, it also greatly optimizes the process allowing for increased installations per technician per day. The monitored assets are added to online applications in real time and remote monitoring commences immediately upon the end of technician visit. Other embodiments are addressed herein.

13 Claims, 15 Drawing Sheets

(56) References Cited

U.S. PATENT DOCUMENTS

2010/0191370 A1* 7/2010 Barragan Trevino ........................
G06Q 10/06
700/244
2012/0029691 A1* 2/2012 Mockus ................ G06Q 20/18
700/232
2013/0144432 A1 6/2013 Canter et al.

OTHER PUBLICATIONS

Mexican Institute of Industrial Property, Second Office Action dated Nov. 30, 2018 in Mexican patent application No. MX/a/2016/011916, 10 pages.
Canadian Intellectual Property Office, Notice of Allowance dated Jun. 6, 2018 for Canadian patent application No. 2,942,563, one page.
Mexican Institute of Industrial Property, Office Action No. 21462 dated May 12, 2018 in Mexican Patent Application No. MX/a/2016/011916.
Canadian Intellectual Property Office, Office Action dated May 31, 2017 in Canadian Patent Application 2,942,563.
International Searching Authority, "Notification of Transmittal of the International Search Report and the Written Opinion of the International Searching Authority," dated Jun. 8, 2015, in International application No. PCT/US2015/022083.
European Patent Office, Communication Pursuant to Article 94(3) EPC, dated Sep. 9, 2019, 7 pages.

* cited by examiner

SYSTEMS AND METHODS FOR INSTALLATION OF A REMOTELY MONITORED VENDING NETWORK

PRIORITY CLAIM

This application claims priority to U.S. Provisional Patent Application No. 61/969,581 filed on Mar. 24, 2014 and entitled "Systems and Methods for Installation of a Remotely Monitored Vending Network", the content of which is hereby incorporated by reference.

TECHNICAL FIELD

An embodiment addresses provisioning vending machine (VM) systems.

BACKGROUND

Due to the current state of VM telemetry deployment, there is a significant retrofit process that is required. Specifically, the decision to establish machine to machine (M2M) telemetry by a vending operator is typically made after that operator already has a very large and geographically dispersed deployment of VMs. This requires the field operations team to visit each VM in the network and perform all installation of hardware and telemetry devices and also to perform all configuration and parameterization steps for establishing network communications and valid VM monitoring. This is currently a loosely managed, mostly manual process with each technician keeping paper-based records and following an unmarshalled workflow.

BRIEF DESCRIPTION OF THE DRAWINGS

Features and advantages of embodiments of the present invention will become apparent from the appended claims, the following detailed description of one or more example embodiments, and the corresponding figures. Where considered appropriate, reference labels have been repeated among the figures to indicate corresponding or analogous elements.

DETAILED DESCRIPTION

Figure 1A:
FIGS. 1(a)-(b) depict a configuration of a VM system in an embodiment of the invention.

In the following description, numerous specific details are set forth but embodiments of the invention may be practiced without these specific details. Well-known circuits, structures and techniques have not been shown in detail to avoid obscuring an understanding of this description. "An embodiment", "various embodiments" and the like indicate embodiment(s) so described may include particular features, structures, or characteristics, but not every embodiment necessarily includes the particular features, structures, or characteristics. Some embodiments may have some, all, or none of the features described for other embodiments. "First", "second", "third" and the like describe a common object and indicate different instances of like objects are being referred to. Such adjectives do not imply objects so described must be in a given sequence, either temporally, spatially, in ranking, or in any other manner.

An embodiment provides a system of automated workflow management and active checkpoint validation that streamlines and standardizes the VM provisioning process. The embodiment not only normalizes the installation and deployment process across geographic and personnel differences, it also greatly optimizes the process allowing for increased installations per technician per day. The monitored assets (VMs) are added to online applications in real time and remote monitoring commences immediately upon the end of technician visit.

As mentioned above, prior to embodiments described herein the deployment of telemetry into a currently deployed vending network meant a labor intensive process with the following steps: (1) scheduling a day's installation route based upon a variety of subjective metrics, (2) traveling to each VM and gaining access to its internal controls (a service affecting process), (3) performing the physical installation of the telemetry device, antenna placement, power supply, cabling, and the like, (4) manually capturing current VM characteristics such as current inventory on hand, cash on hand, and the like to be used as a baseline for online analytics, (5) verifying proper VM function post-installation, closing and securing the machine for unattended service, and the like, and (6) moving on to the next installation site while attempting to manage time and equipment variables encountered.

As can be imagined, the above process is a series of complicated manual steps where the "fast path" is well defined. However, "exception pathways" can arise from any number of factors such as technician quality, radio signal strength, location hazards, equipment failures, and the like. This greatly increases variation in results not only across technicians but also across the daily progress of a single technician. Even when the results are the best they can be, the resulting data flow is a paper-based set of daily progress records which must be collected, interpreted and manually entered into the online systems by a person in the back-office of the enterprise. This phase of the process introduces not only a significant delay in actually monitoring the remote asset, it also provides another opportunity for human error to be introduced and impact data accuracy.

To solve some or all of the above issues (or make improvements thereto), an embodiment utilizes three subsystems to streamline workflow and insure or foster a normalized process and full information capture. A first subsystem includes a mobile computing node (e.g. Smartphone) based application that is in dialog with a remote computing node (e.g., centrally located application servers). A second subsystem includes a control logic and network connectivity that are present in the telemetry device. This, for example, is a device in a vending machine (VM) that allows the VM to communicate (e.g., via wireless communication) with a remote computing node. A third subsystem includes a remote computing node, such as a central web-based server application in dialog with the Smartphone application as well as with the telemetry device in the VM.

In an embodiment, these three systems work in concert to create a validated series of steps, each of which is marshalled/governed by the previous results and conditions. At some or all of these steps, the existing network connectivity (e.g., the connectivity of the technician's Smartphone and/or the VM's telemetry module) is utilized to determine the next provisioning step but also to implant a data record (e.g., analogous to paper-based data records described above concerning VM inventory, VM peripheral component serial numbers, and the like) automatically into the monitoring application (e.g., in one or more memories located on the mobile computing node (e.g., Smartphone) and/or server application).

The results of this embodiment of the invention are that installations are tracked either to success or to a logged error condition automatically and in real-time. The machine that was just visited for installation is 100% online and reporting from the moment that the technician is done with the installation. There are little to no paper records to be collected and manually entered. Time is accounted for such that the technician's schedule is automatically optimized. In addition, the technicians' daily production can be monitored in real-time. This allows for identification and ranking of technician production vs. goals and even allows for managed bonus objectives be defined for the organization. More generally speaking, these results translate to normalized VM provisioning that is performed more efficiently/faster and which results in systems being monitored more quickly.

First Subsystem: Smartphone Application

Regarding the first subsystem (Smartphone Based Application), features and aspects of the smartphone are leveraged by this invention to automate and normalize the technician workflow. In an embodiment, the installation process is reduced to a series of steps marshalled by a central application server. Each step is displayed to the technician via the Smartphone display (e.g., element 1014 of FIG. 10) and variance from the proper next-step is not permitted in some embodiments.

In an embodiment a Smartphone camera (or a camera coupled to the first subsystem) is used to capture images of the machine so, for example, a future technician can see what the surroundings are like so she or he can more quickly find the machine) and its contents/inventory. In an embodiment the Smartphone GPS (or a GPS coupled to the first subsystem) and clock are used to capture location and time regarding the VM service visit.

In an embodiment the third subsystem (e.g., server application), second subsystem (e.g., telemetry device such as a VIU), and the first subsystem (e.g., Smartphone) work in concert with each other to validate VM components (e.g., VIU serial number) and inventory (e.g., number of sodas or cell phones included in the VM). Aspects such as a plan-o-gram (POG) and VM inventory are captured by the Smartphone application and validated against the actual remote asset data (e.g., DEX report) sent to the server application by the telemetry device (e.g., VIU).

As used herein, POGs are visual representations of a VM's products or services and may be considered a tool for visual merchandising. In an embodiment, a POG is a diagram or model that indicates the placement of retail products on shelves or within spaces of the VM in order to maximize sales. POGs therefore help dictate a merchandising unit's (e.g., VM) layout of merchandise.

In some embodiments, the Smartphone leverages data connectivity (e.g., 3G connectivity provided by the Smartphone itself and/or connectivity provided by the VM wireless communications module, such as the VIU) to interact with the web-based application server so the first subsystem can capture progress and information while logging and exception reporting in real time.

When exceptions are encountered to the typical path presented to the technician via the Smartphone, the Smartphone application steps the technician through a series of resolution attempts and logs the issues the technician overcomes or is ultimately stopped by. Should the problem be unable to be resolved, a service ticket is automatically generated by the third subsystem (e.g., central server application). The ticket may be noted in a database for the enterprise to treat at a later time.

In cases of severe loss of data connectivity by the Smartphone, a workflow allows the Smartphone to communicate with a remote node/enterprise server through the VM VIU should the VIU maintain data connectivity.

An embodiment allows a fallback mode of operation that allows for intermediate progress to be made by the technician in an "offline" mode. In this case, the Smartphone application will still manage technician workflow and process as best can be done offline and will queue the results for subsequent upload to the server application. In other words, the provisioning steps may be received one by one in real time from a remote server but may also be originated from a Smartphone application as well.

Second Subsystem: Vm Telemetry Device

The primary role of an M2M telemetry device, such as the VIU, is that which comes after the installation process (i.e., ongoing monitoring and management of the remote asset, such as a VM). However, the logic within these telemetry devices can be extended to work in concert with the Smartphone based application (described above) to speed and normalize deployment. Note that the telemetry device also has network connectivity (e.g., 2G/3G data) in some embodiments and this also serves as a pathway back to the remote computing node (e.g., central server application). This device may also be directly connected to the remote asset (e.g., VM controller) and serves as a status and validation data source for the Smartphone application.

The logic of the telemetry device is extended to include, in various embodiments, the following.

First, the telemetry subsystem (e.g., VIU and related logic) may include an installation-focused set of commands that are used by the Smartphone application to validate correct operation of the telemetry device as well as the monitored asset during installation and final deployment. Second, the telemetry subsystem may have data gathering commands to query the VM asset for configuration and other information to be used in the asset database. Third, the telemetry subsystem may have a radio/network signal strength measurement module used for antenna placement and connectivity validation. Fourth, the telemetry subsystem may provide records of the initial inventory and POG baseline records to the server and help in validation of the POG records and/or perform detection of exception conditions.

Third Subsytem: Remote Computing Node

The primary role of the server application is focused upon the ongoing, post-installation phase. However, in an embodiment this application is in real time communication with both the Smartphone application (first subsystem) as well as with the telemetry device (second subsystem) during the installation process. Server features are extended to include to following. First, in an embodiment the third subsystem may include event managed state-machines and/or workflows that are communicated to the Smartphone application based upon events and conditions in the field. Second, in an embodiment the third subsystem may include database management of "service establishment" data (e.g., GPS location, photos, initial POG and inventories, etc.) Third, in an embodiment the third subsystem may correlate vending network topology vs. technician efficiency to produce an optimized schedule and performance measurement metrics. Fourth, in an embodiment the third subsystem may include centralized exception capture and notification routing to an enterprise help desk.

Discussion of Figures

Figure 1B:
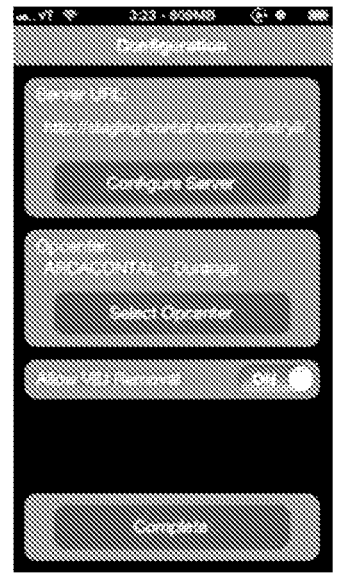

FIGS. 1(a)-(b) depict configuration of a VM system in an embodiment of the invention. FIG. 1(a) begins the provisioning process in an embodiment by asking the technician for password/credentials to enter VM configuration files. FIG. 1(b) allows the technician to determine the proper server to connect with as well as management area or territory to which the VM will be managed. The configuration settings visible in FIG. 1(b) may illustrate whether VIU removal is an option for this particular VM.

Figure 2A:
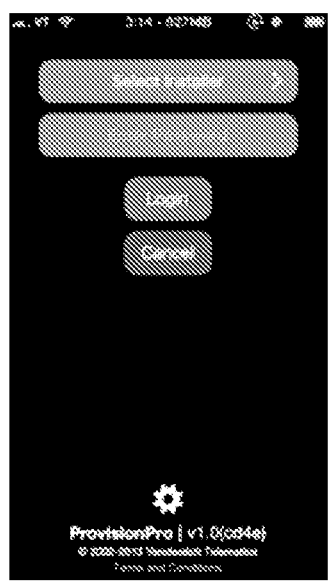
FIGS. 2(a)-(d) depict a login sequence of a VM system in an embodiment of the invention.
Figure 2B:
Figure 2C:
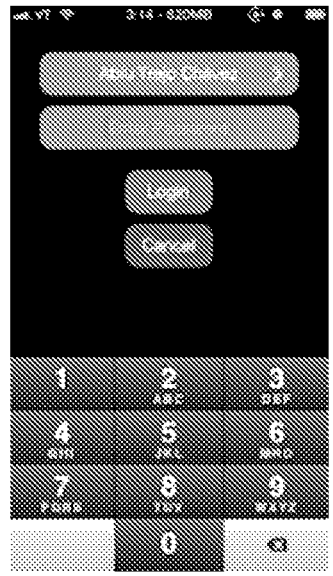
Figure 2D:
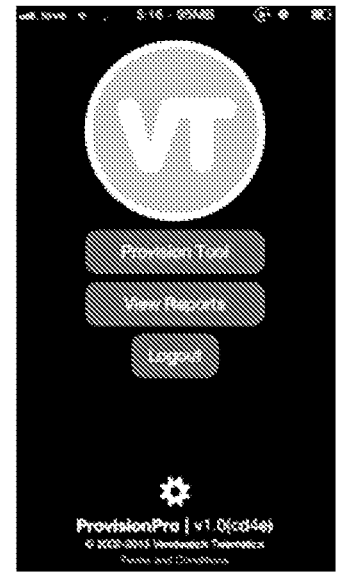

FIGS. 2(a)-(d) depict a log in sequence of a VM system in an embodiment of the invention. FIGS. 2(a)-(c) begin a login process whereby a user selects his or her name from a list sent from the remote computing node. The home screen of FIG. 2(d) is communicated to the technician upon successful login.

Figure 3A:
FIGS. 3(a)-(h) depict vending interface unit (VIU) provisioning in an embodiment of the invention.
Figure 3B:
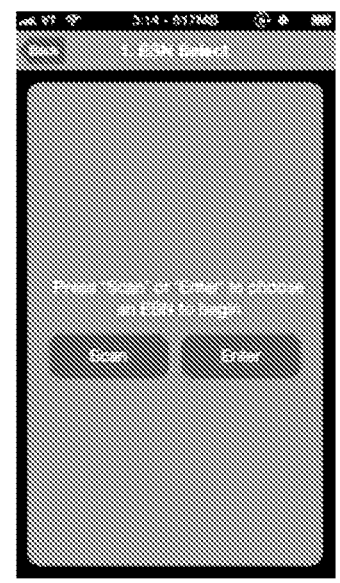
Figure 3C:
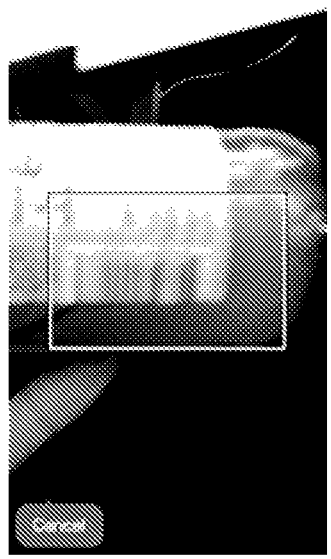
Figure 3D:
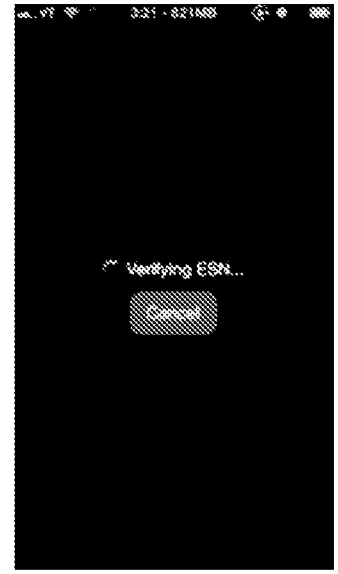

FIGS. 3(a)-(h) depict VIU provisioning in an embodiment of the invention. FIG. 3(a) shows the technician he or she is on step one of the guided six step installation path. The technician may select the electronic serial number (ESN) for the VIU by manual entry or via scanning (FIGS. 3(b)-(c)). In FIG. 3(d) the Smartphone communicates the ESN to the remote computing node in order for the remote computing node to perform an "integrity check" whereby the ESN is compared against database records coupled to the remote computing node. The communication to the remote computing node may be a request to remote computing node to validate the ESN.

Figure 3E:
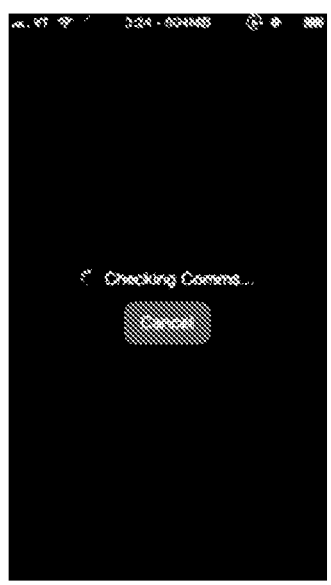
Figure 3F:
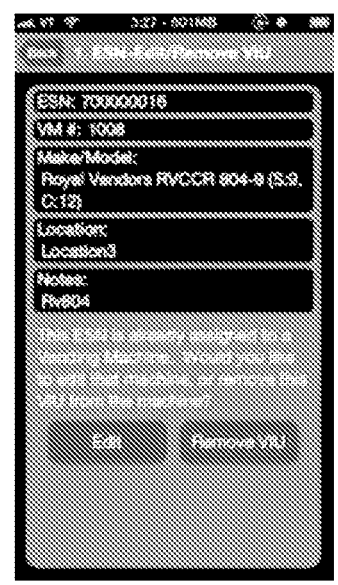
Figure 3G:
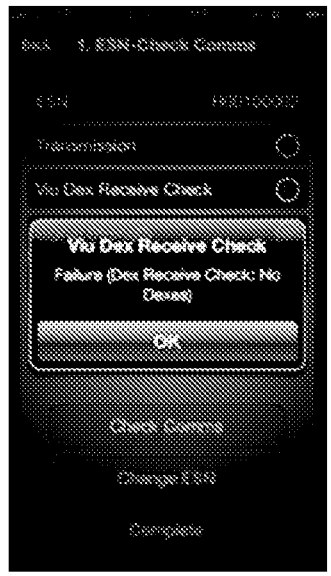
Figure 3H:
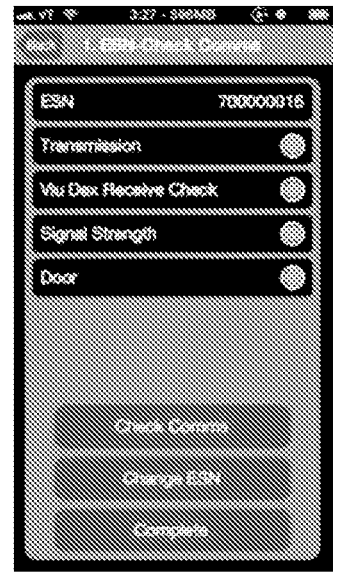

In FIG. 3(e) a communications check occurs. This may entail determining whether a communication signal (between the VM and the remote computing node) satisfies a minimum strength level. FIG. 3(f) provides a summary of the VIU (to which the ESN pertains) state as that state is maintained with the remote computing node. The state information may include a location where the VM is located, the VM serial number or identifier, the ESN identifier, and general notes about the VM (e.g., a technician may indicate this particular machine has trouble with peripheral Q, this particular VM has been vandalized repeatedly, etc.). In this example of FIG. 3(f) the integrity check from FIG. 3(d) shows the ESN is already assigned to another VM. This "exception condition" is met with text helping the technician trouble shoot the situation (e.g., whether the technician wishes to uninstall this VM from the VM to which the remote computing node has it assigned, or to override the remote computing system's record and newly assign the VIU to this VM). In FIG. 3(g) the remote computing node determines a DEX report has not been sent to the remote computing node via the newly installed VIU, while FIG. 3(h) indicates the problem has been resolved with a successful DEX report transmission from the VIU to the remote computing node.

Figure 4A:
FIGS. 4(a)-(e) depict VM data provisioning in an embodiment of the invention.
Figure 4B:
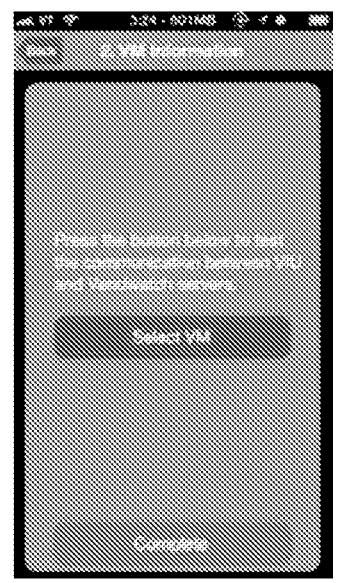
Figure 4C:
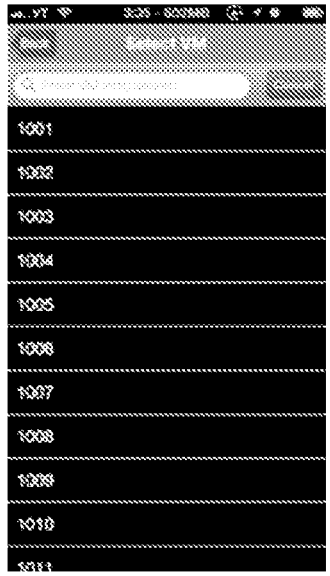
Figure 4D:
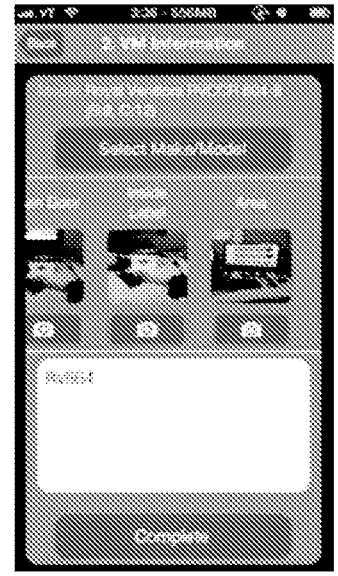
Figure 4E:

FIGS. 4(a)-(e) depict VM data provisioning in an embodiment of the invention. FIG. 4(a) shows the technician he or she is on step two of the guided six step installation path. The technician selects the VM he is servicing (FIGS. 4(b)-(c)) by selecting a value from a list communicated to the Smartphone application from the remote computing node. In FIG. 4(d) photo capturing may take place so the remote computing node can assess the environment in which the VM is located and future technicians can quickly see where the VM is located. Notes may also be entered at the bottom field of FIG. 4(d). In FIG. 4(e) the user/technician selects the VM make/model details from a list of make/model information supplied by the remote computing node.

Figure 5A:
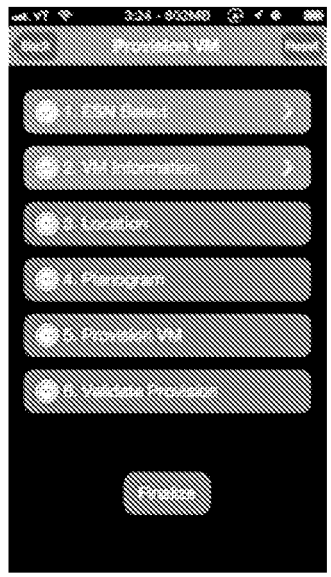
FIGS. 5(a)-(b) depict location provisioning in an embodiment of the invention.
Figure 5B:
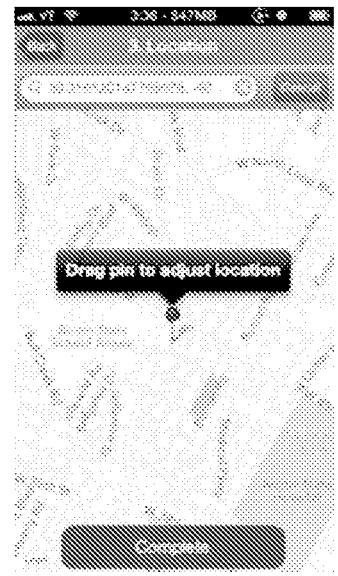

FIGS. 5(a)-(b) depict location provisioning in an embodiment of the invention. FIG. 5(a) shows the technician he or she is on step three of the guided six step installation path. FIG. 5(b) shows a location pin (e.g., GPS derived) as dropped and entered by the user so the exact location of this device is set.

Figure 6A:
FIGS. 6(a)-(g) depict plan-o-gram (POG) provisioning in an embodiment of the invention.
Figure 6B:
Figure 6C:
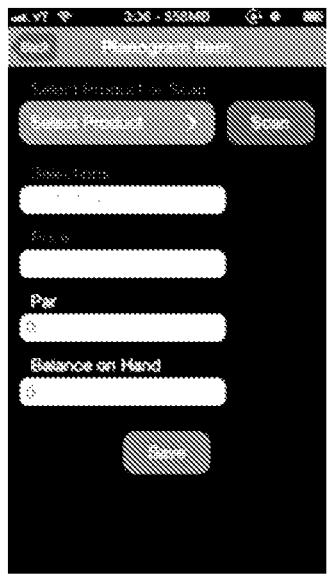
Figure 6D:
Figure 6E:
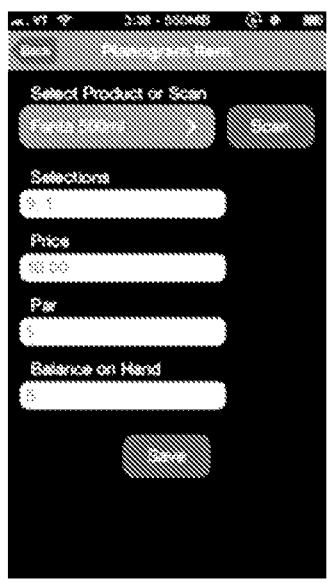
Figure 6F:
Figure 6G:

FIGS. 6(a)-(g) depict POG provisioning in an embodiment of the invention. FIG. 6(a) shows the technician he or she is on step four of the guided six step installation path. FIG. 6(b) displays the existing POG of record (stored in the VM and/or Smartphone and/or remote computing node and sent to the Smartphone) with an option to add a new product to the POG. FIGS. 6(c)-(d) show the capacity for selection of a new product and placement into locations 1, 2, 3 of the VM (e.g., trays or chutes or bins), along with pricing and the inventory on hand. The identifier for the product may be keyed or scanned in. FIG. 6(e) shows the actual attempted addition of a new product into the POG. FIG. 6(f) shows an error occurs when a previous POG (FIG. 6(b)) has a product for position 3 (e.g., soda type A in chute #3 of the VM) of the VM and the new selection is slated for position 3 of the VM (e.g., soda type B in chute #3 of the VM). FIG. 6(g) shows the technician has resolved the issue and now only slates one product for position 3 (e.g., soda type B). FIG. 6(g) includes a summary page for the POG.

Figure 7A:
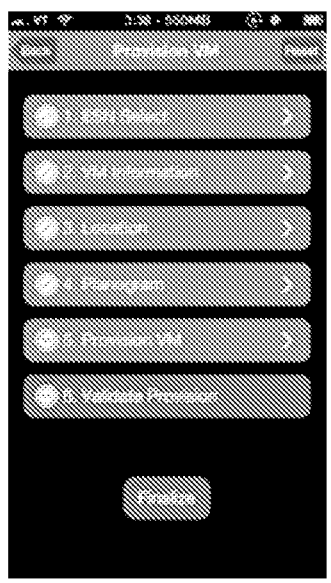
FIGS. 7(a)-(e) depict VM provisioning in an embodiment of the invention.
Figure 7B:
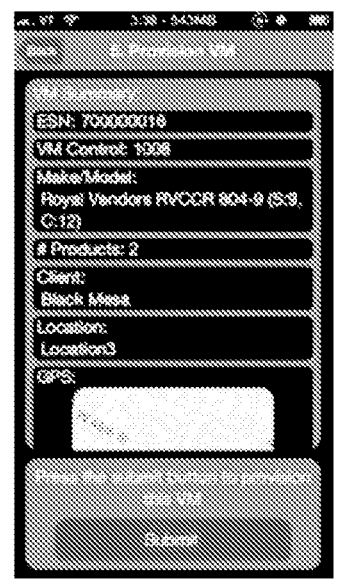
Figure 7C:
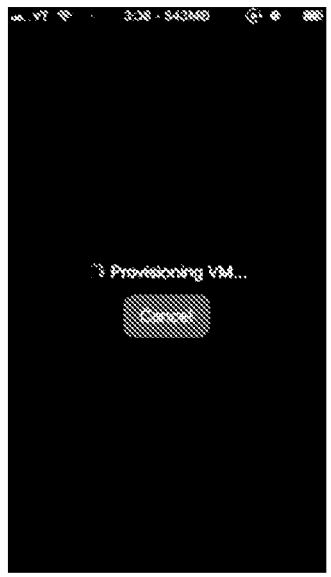
Figure 7D:
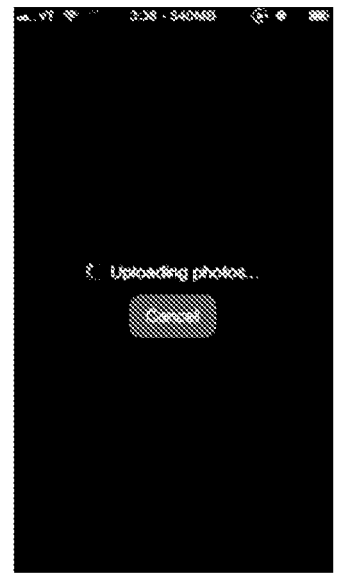
Figure 7E:
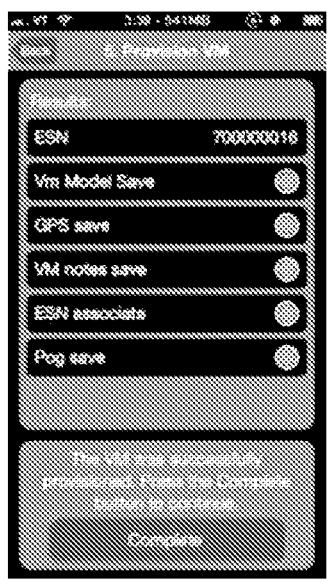

FIGS. 7(a)-(e) depict VM provisioning in an embodiment of the invention. FIG. 7(a) shows the technician he or she is on step five of the guided six step installation path. FIG. 7(b) shows a summary of the provisioned data for the VM, including the client that manages the VM, the model of the VM, the VIU ESN, GPS coordinates for the VM, and the like. FIGS. 7(c)-(d) show provisioning information to the remote node occurs in steps as the photos are uploaded (FIG. 7(d)) along with other information shown in FIG. 7(b) from the Smartphone application to the remote computing node. FIG. 7(e) shows upon submission of the provisioning data to the remote computing node a summary or status report is conveyed to the user to inform him or her that the VM has been successfully provisioned by way of illuminating green dots for the VM model updated, the GPS coordinates being uploaded, the VM notes entered, the ESN properly associated with only one VM, and a POG successfully uploaded to the remote computing node.

In an embodiment, a drop down panel shows a summary view of the information that is going to be submitted to the server via the process of FIGS. 7(a)-(e). On submission, the application packs collected data and sends the same to the server, including GPS coordinates. The server validates the DEX report against the POG, logs coordinates, stores photos, and sends a detailed response about the status of each sub-operation to the Smartphone. The application parses the server response to give a detailed status report.

Figure 8A:
FIGS. 8(a)-(e) depict provisioning validation in an embodiment of the invention.
Figure 8B:
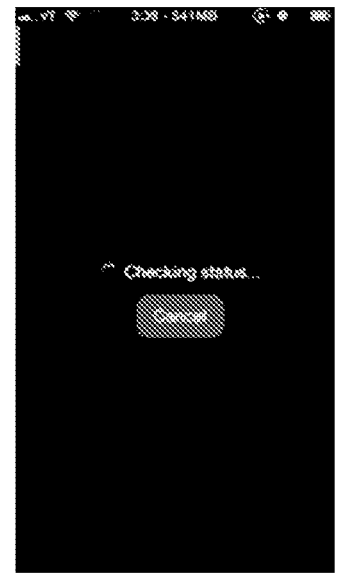
Figure 8:
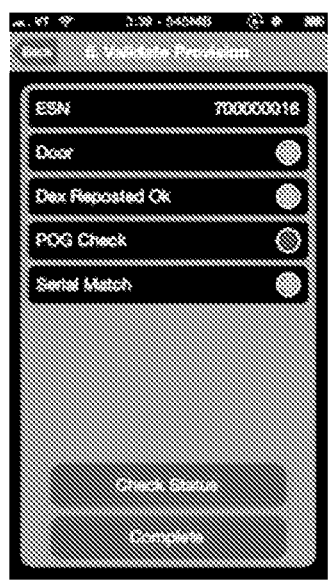
Figure 8D:
Figure 8E:
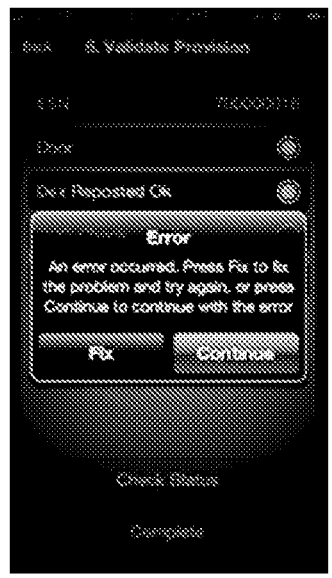
Figure 9A:
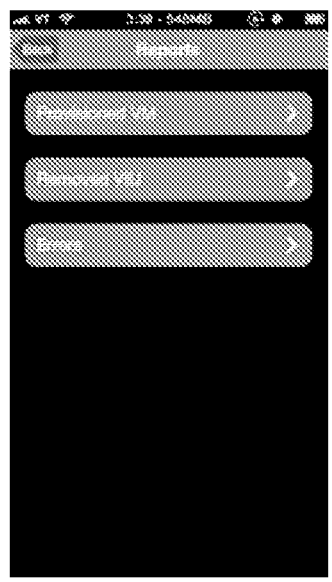
FIGS. 9(a)-(d) depict reporting in an embodiment of the invention.
Figure 9B:
Figure 9C:
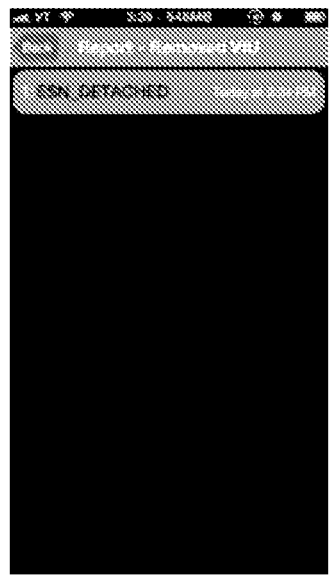
Figure 9D:
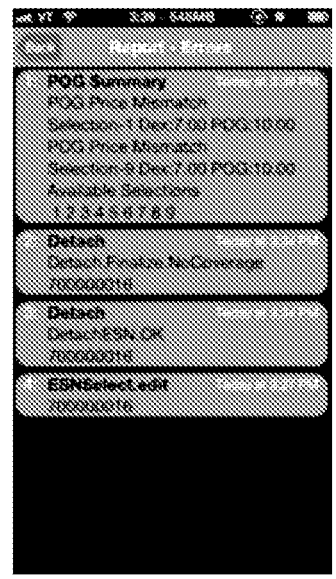

FIGS. 8(a)-(e) depict provisioning validation in an embodiment of the invention. FIG. 8(a) shows the technician he or she is on step six of the guided six step installation path. FIG. 8(b) shows the remote computing node being queried by the Smartphone application. FIG. 8(c) shows a provision status report conveyed to the user from the remote computing node. For example, in FIG. 8(c) the ESN was properly associated with the VM, the door switch (which determines whether a door to the VM is indicated as being open (green) or closed (red) was properly closed, the DEX report was successfully uploaded from the VM to the remote computing node, the serial number between the VM (and for the VM) and the remote computing node match. However, the POG was not validated as evidenced by the red light. FIG. 8(d) indicates the conflict is between the POG and what the DEX report indicates (e.g., a price mismatch between the POG, which may be set by management via the remote computing node, and the VM, which may be set by the user). In FIG. 8(e) the user is asked whether he wants to proceed despite the error or fix the error. If she or he proceeds the entry is logged to be reported out at a later time.

In an embodiment a full DEX report is received by the server and returned to the VIU pursuant to VIU communications. In such a case a POG edit page will be pre-populated with as much data is available. The POG is validated against this full DEX report, so if there is a discrepancy this task will not be marked as completed (e.g., see FIG. 8(c)). If a full DEX report has not yet been received, that would be reflected in the VIU Communication task. A button to rescan inventory, VIU, and the like will appear in the case of a discrepancy.

Regarding product entry into a POG, in an embodiment the user is given the option to barcode scan the product or select the product from a two-tier menu (first selecting Brand, then Product). If the user tries the barcode scanner but no match is found, the user will be prompted to select the product from the two-tier menu. When the data is submitted to the server, the application passes along the UPC, brand, and product information, so that the server can store it for the next time that product is scanned.

FIGS. 9(a)-(d) depict reporting in an embodiment of the invention. The reports section (FIG. 9(a)) is accessed from the home screen of the Smartphone application and indicates all VMs provisioned in a day (FIG. 9(b)), all VIUs removed (FIG. 9(c)), and a report for all errors encountered by the user (FIG. 9(d)).

Figure 10:
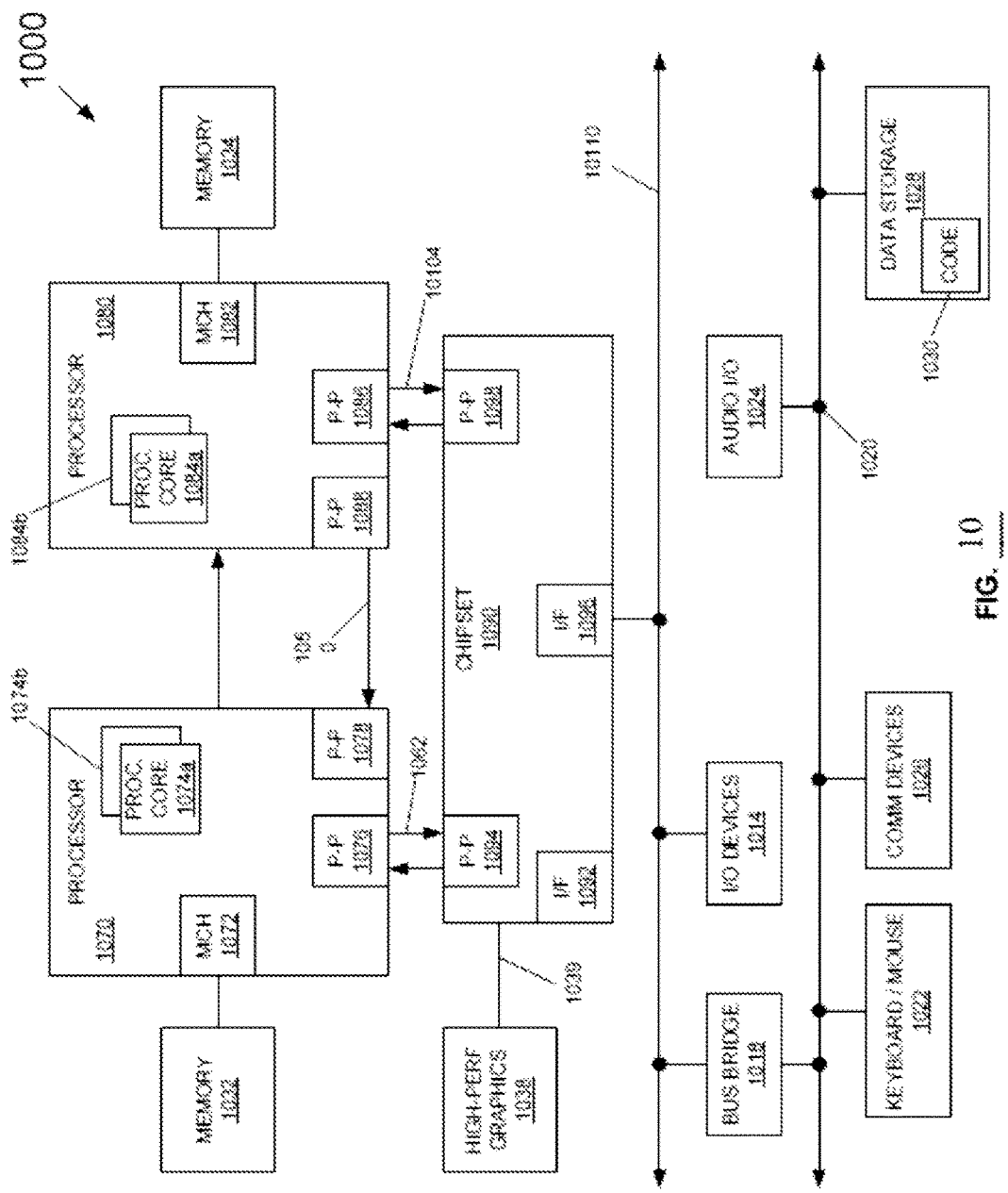
FIG. 10 depicts a system for implementing a computing node, such as a VIU or remote computing node (e.g., server or server system), for embodiments of the invention.

FIG. 10 depicts a system for implementing a computing node, such as a VIU or remote computing node (e.g., server or server system), for embodiments of the invention. This application at times discusses Smartphones, servers, and telemetry devices. These are all examples of computing nodes. Each such computing node may utilize a system such as the system of FIG. 10, discussed below. In fact, embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein (which should be interpreted as including the content of the Appendices) may be provided as (a) a computer program product that may include one or more machine readable media having stored thereon instructions that may be used to program a processing system or other electronic device to perform the methods or (b) at least one storage medium having instructions stored thereon for causing a system to perform the methods. The term "machine readable medium" or "storage medium" used herein shall include any medium that is capable of storing or encoding a sequence of instructions (transitory media, including signals, or non-transitory media) for execution by the machine and that cause the machine to perform any one of the methods described herein. The term "machine readable medium" or "storage medium" shall accordingly include, but not be limited to, memories such as solid-state memories, optical and magnetic disks, read-only memory (ROM), programmable ROM (PROM), erasable PROM (EPROM), electrically EPROM (EEPROM), a disk drive, a floppy disk, a compact disk ROM (CD-ROM), a digital versatile disk (DVD), flash memory, a magneto-optical disk, as well as more exotic mediums such as machine-accessible biological state preserving or signal preserving storage. A medium may include any mechanism for storing, transmitting, or receiving information in a form readable by a machine, and the medium may include a medium through which the program code may pass, such as antennas, optical fibers, communications interfaces, etc. Program code may be transmitted in the form of packets, serial data, parallel data, etc., and may be used in a compressed or encrypted format. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

Referring now to FIG. 10, shown is a block diagram of a system embodiment 1000 in accordance with an embodiment of the present invention. System 1000 may be included in, for example, a server, VIU, desktop, or a mobile computing node such as a cellular phone, Smartphone, tablet, Ultrabook®, notebook, laptop, personal digital assistant, and mobile processor based platform.

Shown is a multiprocessor system 1000 that includes a first processing element 1070 and a second processing element 1080. While two processing elements 1070 and 1080 are shown, it is to be understood that an embodiment of system 1000 may also include only one such processing element. System 1000 is illustrated as a point-to-point interconnect system, wherein the first processing element 1070 and second processing element 1080 are coupled via a point-to-point interconnect 1050. It should be understood that any or all of the interconnects illustrated may be implemented as a multi-drop bus rather than point-to-point interconnect. As shown, each of processing elements 1070 and 1080 may be multicore processors, including first and second processor cores (i.e., processor cores 1074a and 1074b and processor cores 1084a and 1084b). Such cores 1074, 1074b, 1084a, 1084b may be configured to execute instruction code in a manner similar to methods discussed herein.

Each processing element 1070, 1080 may include at least one shared cache. The shared cache may store data (e.g., instructions) that are utilized by one or more components of the processor, such as the cores 1074a, 1074b and 1084a, 1084b, respectively. For example, the shared cache may locally cache data stored in a memory 1032, 1034 for faster access by components of the processor. In one or more embodiments, the shared cache may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the present invention is not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, microarchitectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

First processing element 1070 may further include memory controller logic (MC) 1072 and point-to-point (P-P) interfaces 1076 and 1078. Similarly, second processing element 1080 may include a MC 1082 and P-P interfaces 1086 and 1088. MC's 1072 and 1082 couple the processors to respective memories, namely a memory 1032 and a memory 1034, which may be portions of main memory locally attached to the respective processors. While MC logic 1072 and 1082 is illustrated as integrated into the processing elements 1070, 1080, for alternative embodiments the MC logic may be discreet logic outside the processing elements 1070, 1080 rather than integrated therein.

First processing element 1070 and second processing element 1080 may be coupled to an I/O subsystem 1090 via P-P interfaces 1076, 1086 via P-P interconnects 1062, 10104, respectively. As shown, I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, a bus may be used to couple graphics engine 1038 to I/O subsystem 1090. Alternately, a point-to-point interconnect 1039 may couple these components.

In turn, I/O subsystem 1090 may be coupled to a first bus 10110 via an interface 1096. In one embodiment, first bus 10110 may be a Peripheral Component Interconnect (PCI) bus, or a bus such as a PCI Express bus or another third generation I/O interconnect bus, although the scope of the present invention is not so limited.

As shown, various I/O devices 1014, 1024 may be coupled to first bus 10110, along with a bus bridge 1018 which may couple first bus 10110 to a second bus 1020. In one embodiment, second bus 1020 may be a low pin count (LPC) bus. Various devices may be coupled to second bus 1020 including, for example, a keyboard/mouse 1022, communication device(s) 1026 (which may in turn be in communication with a computer network), and a data storage unit 1028 such as a disk drive or other mass storage device which may include code 1030, in one embodiment. The code 1030 may include instructions for performing embodiments of one or more of the methods described above. Further, an audio I/O 1024 may be coupled to second bus 1020.

Note that other embodiments are contemplated. For example, instead of the point-to-point architecture shown, a system may implement a multi-drop bus or another such communication topology. Also, the elements of FIG. 1 may alternatively be partitioned using more or fewer integrated chips than shown in the FIG. 1.

A module as used herein refers to any hardware, software, firmware, or a combination thereof. For example, a Smartphone may have video (e.g., 1014 of FIG. 10) and audio modules (e.g., element 104 of FIG. 10) with which to communicate with the technician. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices. However, in another embodiment, logic also includes software or code integrated with hardware, such as firmware or micro-code. In an embodiment, the VIU includes a communications module with which the VIU can communicate with peripheral modules of the VM (e.g., video display of VM) as well as a video module of wirelessly coupled devices, such as a Smartphone held by the VM technician, or an I/O module of a server.

Figure 11:
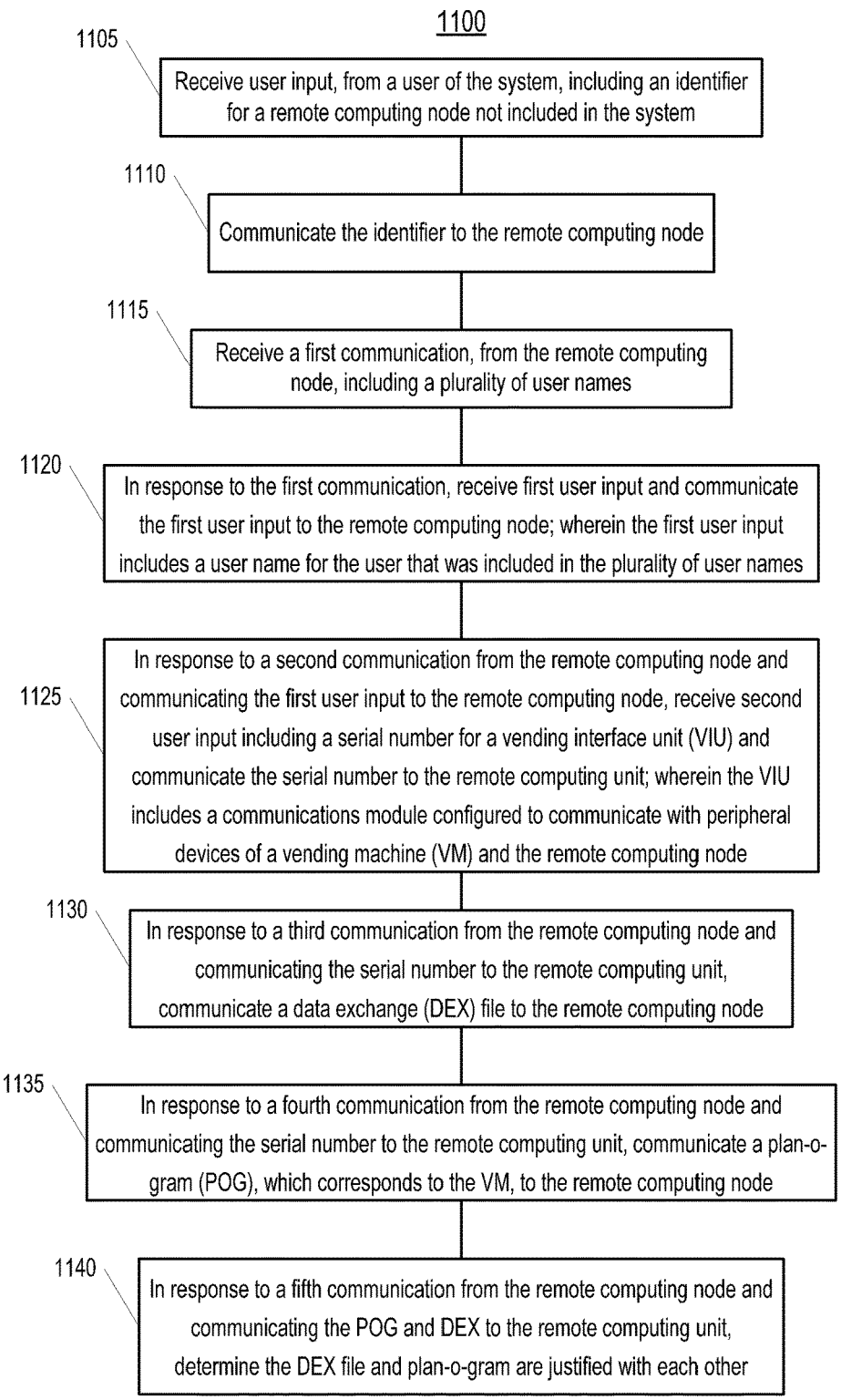
FIG. 11 includes a process in an embodiment of the invention.

FIG. 11 includes a process 1100 in an embodiment of the invention.

Element 1105 includes receiving user input, from a user of the system, including an identifier for a remote computing node not included in the system. For example, in FIG. 1(b) the identifier may be an address or name for a remote computing node, such as a server, located far away from the mobile computing node being used by the user. Element 1110 includes communicating the identifier to the remote computing node. Element 1115 includes receiving a first communication, from the remote computing node, including a plurality of user names. This may include a listing such as the one in FIG. 2(b).

Element 1120 includes in response to the first communication, receive first user input and communicate the first user input to the remote computing node; wherein the first user input includes a user name for the user that was included in the plurality of user names.

Element 1125 includes in response to a second communication from the remote computing node and communicating the first user input to the remote computing node, receive second user input including a serial number for a vending interface unit (VIU) and communicate the serial number to the remote computing unit; wherein the VIU includes a communications module configured to communicate with peripheral devices of a vending machine (VM) and the remote computing node.

This provides an example of how "in response to" should be construed herein. The example addresses how a screen, like FIG. 3(b), asks for ESN but not until earlier tasks (e.g., user entering his name) are completed. Furthermore, as seen in element 1130, this task must be done before other tasks such as element 1130. Thus, there is a temporal and/or logical sequence of events that direct a technician and promote normalization of provisioning. While in this instance the steps must be performed in a certain sequence, in other embodiments steps may be rearranged (e.g., step 1105 is omitted and step 1130 occurs before step 1125).

Element 1130 includes in response to a third communication from the remote computing node and communicating the serial number to the remote computing unit, communicate a data exchange (DEX) file to the remote computing node. For example, the third communication may be shown or not shown to the user. FIG. 3(g) shows what happens when the user has not delivered the DEX file and may constitute the third communication. However, in other embodiments the third communication may not be seen and instead may be a mere "ready" signal transmitted from the remote computing node to the VIU. Also, "communicating" as used herein is to be broadly interpreted such that, for example, "communicating the serial number to the remote computing unit" could mean a VIU sends ("pushes") a number (or hash thereof) to the remote computing node, or the remote computing node takes ("pulls") the number from the VIU in typical "push" or "pull" machine to machine communications.

Element 1135 includes in response to a fourth communication from the remote computing node and communicating the serial number to the remote computing unit, communicate a plan-o-gram (POG), which corresponds to the VM, to the remote computing node. For example, the fourth communication may be the display shown in FIG. 6(a).

Element 1140 includes in response to a fifth communication from the remote computing node and communicating the POG and DEX to the remote computing unit, determine the DEX file and plan-o-gram are justified with each other. For example, the fifth communication may be unseen or may be the display of FIG. 7(a). This again shows the step by step nature of an embodiment that keeps a technician, who may be new on the job and inexperienced, on the right track to properly provision a VM. By "justified" the POG and DEX are validated against one another as shown, for example, in FIG. 8(d).

In an embodiment the first, second, third, and fourth communications are displayed to the user via a display module (via I/O 1014) included in the system. In other embodiments the communication may be audio via an audio module (via I/O 1024).

In an embodiment the mobile application/Smartphone based application is to automate the VIU installation process. To accomplish this, the installation and verification process is reduced to a standardized workflow with all field operations following the same process and series of checks and validation steps. The successful end result is a validated connection to the monitored VM, a validated radio and IP connectivity access, and a consistent data "implant" into remote servers for that site.

Figure 12:
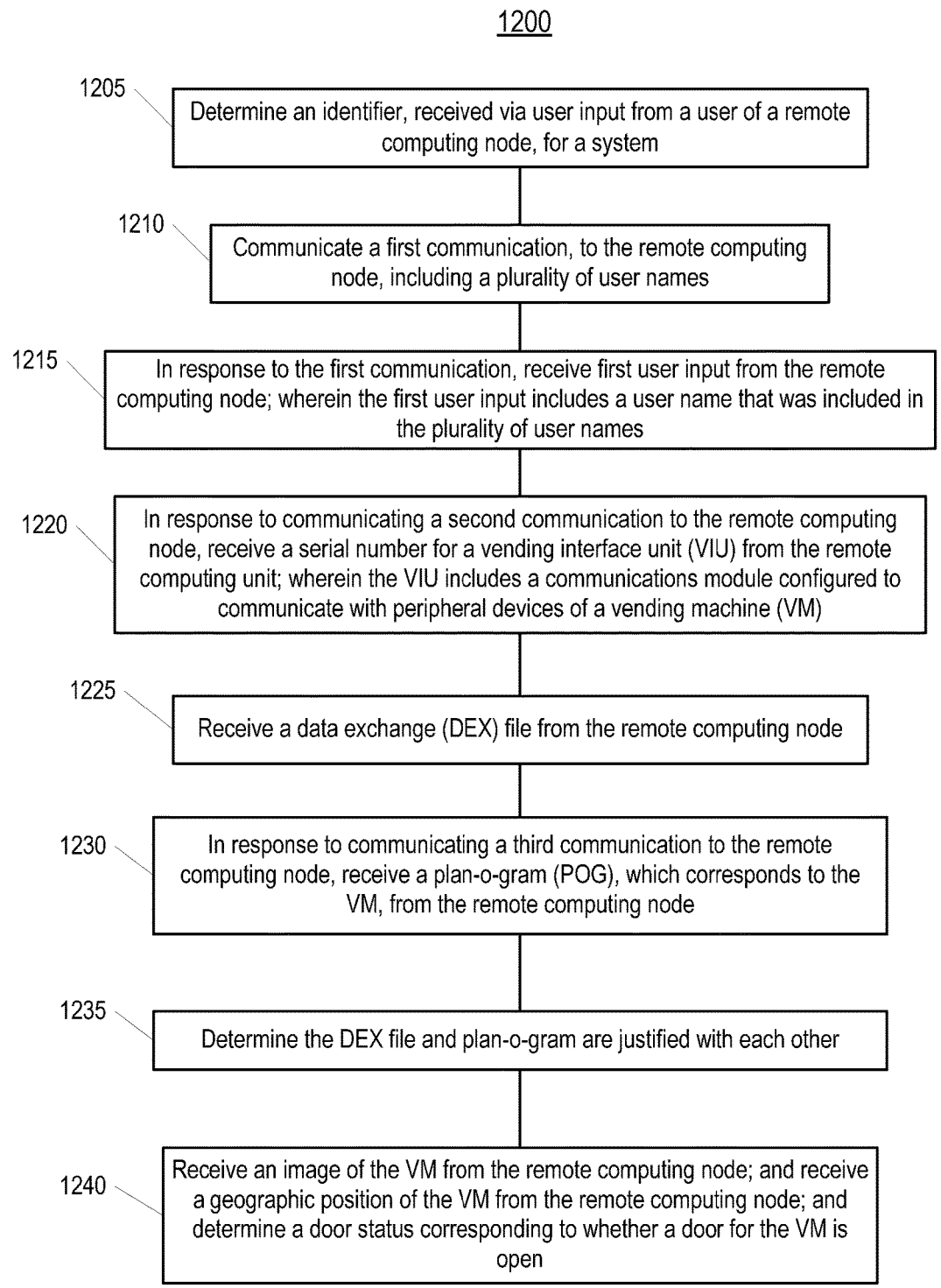
FIG. 12 includes a process in an embodiment of the invention.

FIG. 12 includes a process 1200 in an embodiment. This process may cooperate in conjunction with, or independently of, process 1100. This process is taken from the context of a server instead of a Smartphone or mobile computing node (as was the case in FIG. 11).

Element 1205 includes determining an identifier, received via user input from a user of a remote computing node, for a system. For example, a server may determine an identifier that matches that of the server. The remote computing node may include a Smartphone communicating directly with the server or via a VM. The remote computing node may include the VM.

Element 1210 includes communicating a first communication, to the remote computing node, including a plurality of user names.

Element 1215 includes in response to the first communication, receiving first user input from the remote computing node; wherein the first user input includes a user name that was included in the plurality of user names. Of course, other embodiments may omit elements 1210 and 1215 altogether.

1220: In response to communicating a second communication to the remote computing node, receive a serial number for a vending interface unit (VIU) from the remote computing unit; wherein the VIU includes a communications module configured to communicate with peripheral devices of a vending machine (VM).

As used herein, to "receive" may include pulling information from a remote node or may include receiving information pushed from a remote node to the system.

Element 1225 includes receiving a DEX file from the remote computing node Element 1230 includes, in response to communicating a third communication to the remote computing node, receive a POG, which corresponds to the VM, from the remote computing node.

Element 1235 includes determining the DEX file and plan-o-gram are justified with each other. Element 1240 includes receiving an image of the VM from the remote computing node; and receiving a geographic position of the VM from the remote computing node; and determining a door status corresponding to whether a door for the VM is open.

Element 1245 includes in response to receiving the image and the geographic position and determining the door status, communicating a fourth communication to the remote computing node confirming the VM is successfully provisioned.

Element 1250 includes in response to receiving the identifier, determining a wireless communications signal strength between the VIU and the system satisfies a threshold.

Element 1255 includes in response to receiving the identifier, receive an identifier for the VM from the user via the remote computing node.

Elements may be rearranged or omitted in various embodiments of processes 1100 and 1200. For example, elements 1250, 1255 could take place directly after element 1205.

Example 1a includes at least one storage medium having instructions stored thereon for causing a system to: receive user input, from a user of the system, including an identifier for a remote computing node not included in the system; communicate the identifier to the remote computing node; receive a first communication, from the remote computing node, including a plurality of user names; in response to the first communication, receive first user input and communicate the first user input to the remote computing node; wherein the first user input includes a user name for the user that was included in the plurality of user names; in response to a second communication from the remote computing node and communicating the first user input to the remote computing node, receive second user input including a serial number for a vending interface unit (VIU) and communicate the serial number to the remote computing unit; wherein the VIU includes a communications module configured to communicate with peripheral devices of a vending machine (VM) and the remote computing node; in response to a third communication from the remote computing node and communicating the serial number to the remote computing unit, communicate a data exchange (DEX) file to the remote computing node; in response to a fourth communication from the remote computing node and communicating the serial number to the remote computing unit, communicate a plan-o-gram (POG), which corresponds to the VM, to the remote computing node; and determine the DEX file and plan-o-gram are justified with each other; wherein the first, second, third, and fourth communications are displayed to the user via a display module included in the system.

In example 2a the subject matter of Example 1a can optionally include The at least one medium of claim 1 comprising instructions to: in response to a fifth communication from the remote computing node and communicating the POG and DEX to the remote computing unit, determine the DEX file and plan-o-gram are justified with each other.

In example 3a the subject matter of Examples 1a-2a can optionally communicate an image of the VM to the remote computing node; and in response to communicating the image to the remote computing node, receive a sixth communication from the remote computing node confirming the VM is successfully provisioned; wherein the sixth communication is displayed to the user via the display module. For example, the sixth communication may include an image such as FIG. 7(*e*).

In example 4a the subject matter of Examples 1a-3a can optionally include communicate a geographic position of the VM to the remote computing node; and in response to communicating the geographic position to the remote computing node, receive the sixth communication from the remote computing node confirming the VM is successfully provisioned.

In example 5a the subject matter of Examples 1a-4a can optionally include in response to a seventh communication from the remote computing node and communicating the identifier to the remote computing node, determine a wireless communications signal strength between the VIU and the remote computing node satisfies a threshold as determined by the remote computing node.

For example, FIG. 3(*h*) may indicate the signal strength is acceptable.

In example 6a the subject matter of Examples 1a-5a can optionally include in response to a seventh communication from the remote computing node and communicating the identifier to the remote computing node, receive an identifier for the VM from the user and communicate the identifier for the VM to the remote computing node.

In example 7a the subject matter of Examples 1a-6a can optionally include determine door status corresponding to whether a door for the VM is open; communicate the door status to the remote computing node; and in response to communicating the door status to the remote computing node, receive the sixth communication from the remote computing node confirming the VM is successfully provisioned.

For example, this may concern FIG. 3(*h*) whereby the door to the VM is indicated as being closed. In some embodiments the door must be open in order for logic in the VM controller to be reprogrammed so it is essential the door is closed properly, and a door sensor recognizes that also, before a user leaves or believes he or she has properly provisioned a VM.

Example 8a includes at least one storage medium having instructions stored thereon for causing a system to: determine an identifier, received via user input from a user of a remote computing node, for the system; communicate a first communication, to the remote computing node, including a plurality of user names; in response to the first communication, receive first user input from the remote computing node; wherein the first user input includes a user name that was included in the plurality of user names; in response to communicating a second communication to the remote computing node, receive a serial number for a vending interface unit (VIU) from the remote computing unit; wherein the VIU includes a communications module configured to communicate with peripheral devices of a vending machine (VM); receive a data exchange (DEX) file from the remote computing node; in response to communicating a third communication to the remote computing node, receive a plan-o-gram (POG), which corresponds to the VM, from the remote computing node; and determine the DEX file and plan-o-gram are justified with each other; wherein the first communication is configured to be displayed to the user via a display module included in the remote computing system.

In example 9a the subject matter of Example 8a can optionally include instructions to: receive an image of the VM from the remote computing node; and in response to receiving the image, communicate a fourth communication to the remote computing node confirming the VM is successfully provisioned; wherein the fourth communication is configured to be displayed to the user via the display module.

In example 10a the subject matter of Examples 8a-9a can optionally include instructions to: receive a geographic position of the VM from the remote computing node; and in response to receiving the geographic position, communicate the fourth communication to the remote computing node confirming the VM is successfully provisioned.

In example 11a the subject matter of Examples 8a-10a can optionally include instructions to: in response to receiving the identifier, determine a wireless communications signal strength between the VIU and the system satisfies a threshold.

In example 12a the subject matter of Examples 8a-11a can optionally include instructions to: in response to receiving the identifier, receive an identifier for the VM from the user via the remote computing node.

In example 13a the subject matter of Examples 8a-12a can optionally include instructions to: determine a door status corresponding to whether a door for the VM is open; in response to determining the door status, communicate the fourth communication to the remote computing node confirming the VM is successfully provisioned.

Example 14a include an apparatus comprising: at least one memory and at least one processor, coupled to the at least one memory, to perform operations comprising: communicate a first user input to a remote computing node; wherein the first user input includes a user identifier; in response to a first communication from the remote computing node and communicating the first user input to the remote computing node, receiving a second user input including a serial number for a vending interface unit (VIU) and communicating the serial number to the remote computing unit; wherein the VIU includes a communications module configured to communicate with peripheral devices of a vending machine (VM) and the remote computing node; in response to a second communication from the remote computing node, communicate a data exchange (DEX) file to the remote computing node; in response to a third communication from the remote computing node, communicate a plan-o-gram (POG), which corresponds to the VM, to the remote computing node; and determine the DEX file and plan-o-gram are justified with each other; a display module to display at least one of the first, second, and communications to the user.

In example 15a the subject matter of Example 14a can optionally include wherein the at least one processor is to perform operations comprising: in response to a fourth communication from the remote computing node and communicating the POG and DEX to the remote computing unit, determining the DEX file and plan-o-gram are justified with each other.

In example 16a the subject matter of Examples 14a-15a can optionally include an imaging module to determine an image of the VM; wherein the at least one processor is to perform operations comprising: communicating the image of the VM, determined via the imaging module, to the remote computing node; and in response to communicating the image to the remote computing node, receiving a fourth communication from the remote computing node confirming the VM is successfully provisioned.

In example 17a the subject matter of Examples 14a-16a can optionally include. comprising a positioning module to determine a geographic position; wherein the at least one processor is to perform operations comprising: communicating the geographic position of the VM, determined via the positioning module, to the remote computing node; and in response to communicating the geographic position to the remote computing node, receiving the fourth communication from the remote computing node confirming the VM is successfully provisioned.

In example 18a the subject matter of Examples 14a-17a can optionally include wherein the at least one processor is to perform operations comprising determining a wireless communications signal strength between the VIU and the remote computing node satisfies a threshold.

In example 19a the subject matter of Examples 14a-18a can optionally include wherein the at least one processor is to perform operations comprising receiving an identifier for the VM from the user and communicating the identifier for the VM to the remote computing node.

In example 20a the subject matter of Examples 14a-19a can optionally include wherein the at least one processor is to perform operations comprising: determining a door status corresponding to whether a door for the VM is open; communicating the door status to the remote computing node; and in response to communicating the door status to the remote computing node, receiving the fourth communication from the remote computing node confirming the VM is successfully provisioned.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. At least one non-transitory storage medium having instructions stored thereon for causing a system to:
   determine an identifier, received via user input from a user of a remote computing node, for the system;
   communicate a first communication, to the remote computing node, including a plurality of user names;
   in response to the first communication, receive first user input from the remote computing node; wherein the first user input includes a user name that was included in the plurality of user names;
   in response to communicating a second communication to the remote computing node, receive a serial number for a vending interface unit (VIU) from the remote computing unit; wherein the VIU includes a communications module configured to communicate with peripheral devices of a vending machine (VM);
   receive a data exchange (DEX) file from the remote computing node; in response to communicating a third communication to the remote computing node, receive a plan-o-gram (POG), which corresponds to the VM, from the remote computing node; and determine the DEX file and plan-o-gram are justified with each other; wherein the first communication is configured to be displayed to the user via a display module included in the remote computing system.

2. The at least one medium of claim 1 comprising instructions to:
   receive an image of the VM from the remote computing node; and
   in response to receiving the image, communicate a fourth communication to the remote computing node confirming the VM is successfully provisioned;
   wherein the fourth communication is configured to be displayed to the user via the display module.

3. The at least one medium of claim 2 comprising instructions to:
   receive a geographic position of the VM from the remote computing node; and
   in response to receiving the geographic position, communicate the fourth communication to the remote computing node confirming the VM is successfully provisioned.

4. The at least one medium of claim 3 comprising instructions to: in response to receiving the identifier, determine a wireless communications signal strength between the VIU and the system satisfies a threshold.

5. The at least one medium of claim 3 comprising instructions to:
   in response to receiving the identifier, receive an identifier for the VM from the user via the remote computing node.

6. The at least one medium of claim 2 comprising instructions to:
   determine a door status corresponding to whether a door for the VM is open;
   in response to determining the door status, communicate the fourth communication to the remote computing node confirming the VM is successfully provisioned.

7. An apparatus comprising:
   at least one memory and at least one processor, coupled to the at least one memory, to perform operations comprising:
      communicate a first user input to a remote computing node; wherein the first user input includes a user identifier;
      in response to a first communication from the remote computing node and communicating the first user input to the remote computing node, receiving a second user input including a serial number for a vending interface unit (VIU) and communicating the serial number to the remote computing unit; wherein the VIU includes a communications module configured to communicate with peripheral devices of a vending machine (VM) and the remote computing node;
      in response to a second communication from the remote computing node, communicate a data exchange (DEX) file to the remote computing node;
      in response to a third communication from the remote computing node, communicate a plan-o-gram (POG), which corresponds to the VM, to the remote computing node; and
      determine the DEX file and plan-o-gram are justified with each other;
   a display module to display at least one of the first, second, and communications to the user.

8. The apparatus of claim 7 wherein the at least one processor is to perform operations comprising:
   in response to a fourth communication from the remote computing node and communicating the POG and DEX to the remote computing unit, determining the DEX file and plan-o-gram are justified with each other.

9. The apparatus of claim 7 comprising an imaging module to determine an image of the VM; wherein the at least one processor is to perform operations comprising:
   communicating the image of the VM, determined via the imaging module, to the remote computing node; and
   in response to communicating the image to the remote computing node, receiving a fourth communication from the remote computing node confirming the VM is successfully provisioned.

10. The apparatus of claim 9 comprising a positioning module to determine a geographic position; wherein the at least one processor is to perform operations comprising:
   communicating the geographic position of the VM, determined via the positioning module, to the remote computing node; and
   in response to communicating the geographic position to the remote computing node, receiving the fourth communication from the remote computing node confirming the VM is successfully provisioned.

11. The apparatus of claim 10, wherein the at least one processor is to perform operations comprising determining a wireless communications signal strength between the VIU and the remote computing node satisfies a threshold.

12. The apparatus of claim 10, wherein the at least one processor is to perform operations comprising receiving an identifier for the VM from the user and communicating the identifier for the VM to the remote computing node.

13. The apparatus of claim 9, wherein the at least one processor is to perform operations comprising:
   determining a door status corresponding to whether a door for the VM is open;
   communicating the door status to the remote computing node; and
   in response to communicating the door status to the remote computing node, receiving the fourth communication from the remote computing node confirming the VM is successfully provisioned.

* * * * *